May 12, 1964 C. L. JOHNSON ETAL 3,132,480
GAS TURBINE ENGINE CONTROL USING PLURAL SERVOMOTORS
Filed June 27, 1961 2 Sheets-Sheet 2
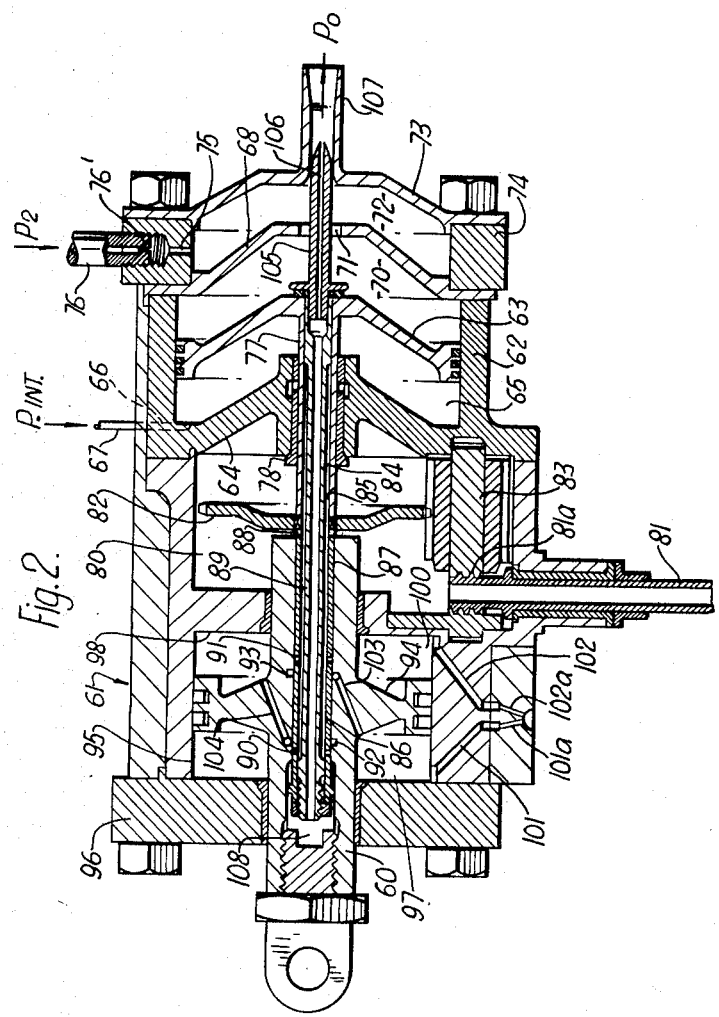
Inventor
Christopher Linley Johnson
Albert Jukk
By
Fred L. Witherspoon, Jr.
Fred F. Shoemaker Attorney

United States Patent Office 3,132,480
Patented May 12, 1964

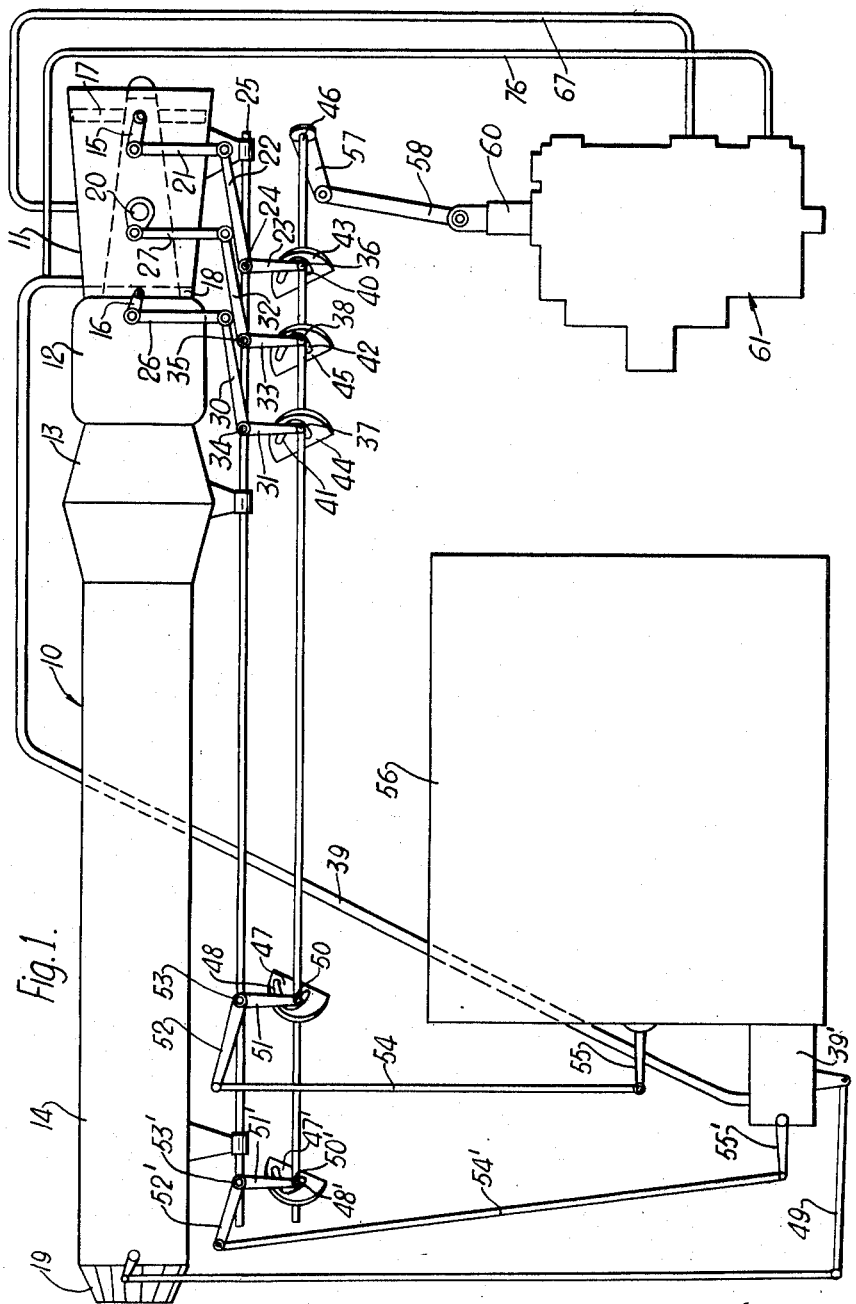

3,132,480
GAS TURBINE ENGINE CONTROL USING PLURAL SERVOMOTORS
Christopher Linley Johnson, Allestree, Derby, and Albert Jubb, Alvaston, Derby, England, assignors to Rolls-Royce Limited, Derby, England, a company of Great Britain
Filed June 27, 1961, Ser. No. 119,874
Claims priority, application Great Britain July 1, 1960
4 Claims. (Cl. 60—39.25)

This invention concerns improvements relating to gas turbine engines.

According to the present invention, there is provided a gas turbine engine comprising a plurality of adjustable engine components which require adjustment in accordance with engine operating conditions, pressure responsive means opposite faces of which are open to two different pressures which are functionally related to pressures prevailing in or at the ends of the compressor means of the engine, and adjustment means controlled by said pressure responsive means for successively adjusting the various engine components as the ratio between the said two different pressures increases or decreases.

The said engine components may comprise compressor inlet and/or outlet guide vanes, and/or a bleed valve arranged to bleed off some of the air compressed in the compressor means of the engine, and/or means for controlling a supply of reheat fuel to the engine and/or a variable area nozzle at the downstream and of the engine jet pipe. Thus the arrangement may be such that, as the said pressure ratio increases, the position of the compressor inlet guide vanes is first adjusted, the bleed valve is closed progressively over all or part of the range of pressure ratios over which the position of the inlet guide vanes is adjusted, then the position of the compressor outlet guide vanes is adjusted, and finally reheat fuel is supplied to the engine and the area of the variable area nozzle is simultaneously increased.

Preferably the pressurer esponsive means controls a servo mechanism which controls the adjustment means.

The servo mechanism preferably comprises a piston which works in a cylinder opposite ends of which are supplied with fuel at substantially the same pressure, and means for bleeding fuel from a given side of the piston upon movement of the pressure responsive means in a given direction.

Preferably all the engine components are connected by individual cam mechanisms to a common member whose position is adapted to be adjusted by the pressure responsive means.

The invention is illustrated, merely by way of example, in the accompanying drawings in which:

FIGURE 1 is a diagrammatic view of a gas turbine engine in accordance with the present invention, and FIGURE 2 is a section through a servo mechanism which constitutes a part of the gas turbine engine shown in FIGURE 1.

The terms "left" and "right" as used in the description which follows are to be understood to refer to the left and the right as viewed in the drawings.

Referring first to FIGURE 1, a gas turbine jet propulsion engine 10 for an aircraft comprises in flow series compressor means 11, combustion equipment 12, and turbine means 13, the turbine exhaust gases being discharged into a jet pipe 14 whose downstream end is provided with a variable area nozzle 19.

The compressor means 11 is provided with levers 15, 16 which respectively control (by mechanical linkages or other transmissions, not shown) the angular disposition of compressor inlet guide vanes 17 and compressor outlet guide vanes 18.

The compressor means 11 is also provided with a lever 20 which controls opening and closing of a bleed valve (not shown) through which air may be bled from an intermediate stage of the compressor during starting of the engine.

The lever 15 is connected by a link 21 to a bell crank lever 22, 23 which is pivoted at 24 on a rod 25. Similarly the levers 16, 20 are respectively connected by links 26, 27 to bell crank levers 30, 31 and 32, 33, the bell crank levers 30, 31 and 32, 33 being respectively pivoted at 34, 35 on the rod 25. Instead of having a common pivot rod 25 for the levers 30, 31, 32 and 33 it will be understood that separate pivot rods may be provided.

The arms 23, 31, 33 of the said bell crank levers are respectively provided with pins 36, 37, 38 which ride in cam slots 40, 41, 42 of cam plates 43, 44, 45 respectively. The cam plates 43, 44, 45 are mounted on a rotatable shaft 46 which also carries cam plates 47, 47' having cam slots 48, 48' respectively. Pins 50, 50' carried by arms 51, 51' respectively of bell crank levers 51, 52, and 51', 52' respectively ride in the cam slots 48, 48' the bell crank levers 51, 52 and 51', 52' being pivoted at 53, 53' respectively on the rod 25.

The arm 52 of the lever 51, 52 is connected by a link 54 to a lever 55 which (by means not shown) controls fuel flow through a fuel control unit 56. The fuel which has passed through the unit 56 is supplied (by means not shown) to the jet pipe 14 for combustion therein so as to effect reheat of the turbine exhaust gases.

The arm 52' is connected by a link 54' to a lever 55'. A pipe 39 is provided to convey compressor delivery air to an air motor 39', the latter being provided with a valve (not shown) which is controlled by the lever 55'. The motor 39' is connected by a linkage 49 to the variable nozzle 19 so as to increase the area of the latter on the supply of reheat fuel to the jet pipe 14.

The shaft 46 has an arm 57 which is connected by a link 58 to a piston rod 60 which forms part of a servo mechanism 61. The servo mechanism 61, which is shown in FIGURE 2 and is described in detail below, serves to effect axial movement of the piston rod 60 in functional relationship with the ratio between the compressor outlet pressure ($P_2$) and a pressure at an intermediate point on the compressor ($P_{INT}$).

Alternatively, the axial movement of the piston rod 60 could be effected in functional relationship with the ratio between any two different compressor pressures.

It will be appreciated that, as the said compressor ratio increases (as will of course happen as the engine is speeded up), the piston rod 60 is moved axially whereby to rotate the shaft 46. The cam slots 40, 41, 42, 48, 48' are so formed that the angular disposition of the compressor inlet guide vanes 17 is changed progressively as the said compressor ratio reaches predetermined values, whilst over the same compressor ratios the bleed valve controlled by the lever 20 is progressively closed. Further increases in the compressor ratio causes the angular disposition of the compressor outlet guide vanes 18 to be changed, and finally causes reheat fuel to be supplied to the jet pipe 14 together with increase in the area of the variable area nozzle 19.

Similarly, of course, as the said compressor ratio is progressively reduced from its maximum value, the supply of reheat fuel is first cut off, while the area of the variable area nozzle 19 is reduced, then the angular disposition of the compressor outlet guide vanes 18 is changed back, then the bleed valve is opened, and the angular disposition of the compressor inlet guide vanes 17 is changed back to its low speed position.

Referring now to FIGURE 2, the servo mechanism 61 comprises a master cylinder 62 within which is slidably mounted a master piston 63. The piston 63 defines with a left hand end wall 64 of the cylinder 62 a chamber 65 which communicates via a drilling 66 with a pipe 67. The pipe 67, which is best seen in FIGURE 1, communicates with an intermediate point on the compressor so as to be supplied with air at the said pressure $P._{\text{INT}}$, referred to as a second control pressure source.

A chamber 70 is provided between the piston 63 and a right hand end wall 68. The chamber 70 communicates, via a hole 71 in the wall 68, with a chamber 72 which is defined between the wall 68 and a right hand end wall 73 of the servo mechanism 61, the walls 68, 73 being spaced apart by an annular spacer 74. The hole 71 is made sufficiently large to ensure that the pressures in the chambers 70, 72 will be substantially equal at all times, the wall 68 serving to prevent hot air impinging on the piston 63.

The spacer 74 has a drilling 75 therethrough which communicates with a pipe 76 through a restrictor 76'. The pipe 76, which is best seen in FIGURE 1, communicates with the outlet end of the compressor means 11 so as to be supplied with air at the pressure $P_2$, and referred to as a first control pressure source.

The master piston 63 is formed integrally with a tubular piston rod 77. The piston rod 77 is slidably mounted in a bush 78 which is itself mounted in the wall 64. The piston rod 77 passes through the bush 78 so as to extend into a chamber 80 which is connected to a supply of low pressure fuel by way of a hollow shaft 81.

Mounted within the chamber 80 is a gear 82 which is drivingly connected to the piston rod 77 and is driven by means of a worm 81a on the hollow shaft 81 which engages with a worm, not shown, which is compounded with a pinion 83. The piston rod 77 will therefore, in operation, be constantly rotated so as to diminish the risk of it sticking.

A tubular member 84, which is mounted within and splined to the piston rod 77, defines with the piston rod 77 an annular space 85. The tubular member 84 is disposed within and is drivingly connected to a sleeve 86 which is slidably mounted within an elongated axial hole 87 in the slave piston rod 60. The sleeve 86 is spaced from the piston rod 77 by a gap 88 which is always in communication with the chamber 80. The sleeve 86 is also spaced from the tubular member 84 by an annular space 89.

The sleeve 86 is provided with two axially spaced sets (e.g. pairs) of radial holes 90, 91 which are adapted to be brought into and out of respective registration with annular chambers 92, 93 which are formed within the piston rod 60.

The piston rod 60 is formed integrally with a slave piston 94 which is slidably mounted in a cylinder 95. The piston rod 60 defines with a left hand end wall 96 of the servo mechanism 61 a chamber 97, and the piston rod 60 defines with a right hand end wall 98 of the cylinder 95 a chamber 100. The cylinder 95 is provided with drillings 101, 102, having restrictions 101a and 102a respectively, which communicate both with a source (not shown) of high pressure fuel and with the chambers 97, 100 respectively. The chambers 97, 100 communicate with the annular chambers 93, 92 respectively by way of drillings 103, 104 which extend through the piston rod 60.

The master piston 63, on its side remote from the piston rod 77, carries an axially extending needle valve 105 having an axial passage 106 therethrough. The wall 73 has an axially extending tubular portion 107 into which the needle valve 105 extends. The right hand end of the tubular portion 107 is open to air at atmospheric pressure ($P_0$).

The left hand end of the sleeve 86 forms an end wall of a chamber 108 which is disposed within the piston rod 60. The chamber 108 is open to the pressure $P_0$ by way of the passage 106 and the hollow interior of the tubular member 84. The pressure $P_0$ is therefore applied to opposite ends of the parts 105, 84 whereby to effect pressure balancing.

In operation, as the engine is speeded up the value of the pressure ratio $P_2/P._{\text{INT}}$ will gradually rise. There will therefore be a pressure differential across the master piston 63 which will cause the latter to move towards the left. This will cause leftward movement of the sleeve 86 until the holes 91 therein are brought into communication with the annular chamber 93. When this occurs, there will be a flow of high pressure fuel from the chamber 97 and via the drilling 103, holes 91, annular space 89, and gap 88 to the chamber 80 and then via the shaft 81 to the region of L.P. fuel. The pressure in the chamber 97 will therefore fall below that of the chamber 100 whereby the piston 94 (and its slave piston rod 60) will be forced towards the left.

The leftward travel of the piston 94, however, will move the annular chamber 93 out of registration with the holes 91. At the same time, the leftward travel of the piston 63 will cause the needle valve 105 to move to a position in which flow through the tubular portion 107 is less obstructed and this will cause the pressure in the chambers 70 and 82 to fall. Thus if the pressure ratio $P_2/P._{\text{INT}}$ rises to and remains at an increased value, the parts of the servo mechanism 61 will swiftly become pressure balanced in their new positions. If, of course, the said ratio continues to increase, there will be continuing movement of the piston rod 60.

When, on the other hand, the pressure ratio $P_2/P._{\text{INT}}$ decreases, the piston 63 and sleeve 86 will move towards the right, the holes 90 will be brought into registration with the annular chamber 92, fuel will flow from the chamber 100 and via the drilling 104, chamber 92, holes 90, space 89, and gap 88 to the chamber 80, and the resulting pressure difference across the piston 94 will cause the latter to move towards the right.

The velocity of movement of the piston 94 can be increased or decreased as desired by suitably varying the size of the restrictions 101a and 102a.

We claim:

1. A fluid-operated servomechanism comprising a casing having separate coaxial master and slave cylinders, master and slave pistons axially slidably mounted in said master and slave cylinders respectively, each piston being connected to a respective shaft and dividing its respective cylinder into two chambers, the shaft of the slave piston having a bore in which the shaft of the master piston is slidably located, means for rotating the shaft of the master piston, a slave motive fluid source and first and second control pressure fluid sources, first and second restricted orifices means providing in said casing, said slave piston motive fluid source being connected to each of the two chambers separated by the slave piston via said first restricted orifice means, and said first control pressure fluid source being connected to one of the two chambers separated by the master piston via said second restricted orifice means, said casing further having aperture means whereby said second control pressure fluid source is connected to the other of the two chambers separated by the master piston, said one chamber having bleed valve means controlled by the relative position of the master piston in its cylinder for bleeding from said one chamber pressure fluid originating from said first control pressure fluid source, whereby the pressure in said one chamber is reduced below the pressure of said first control pressure fluid source, and the master piston is adjusted in its cylinder to a relative position depending uniquely on the relative pressures of said first and second control pressure fluid sources, the master and slave cylinders being axially separated by an exhaust chamber connected to exhaust, said slave piston and shaft thereof having passageways connecting each chamber separated by the slave piston to the bore of that shaft, the shaft of the master piston located in said bore having means for selectively connecting one of said passageways to the exhaust chamber, depending on the direction in which the master piston is adjusted in its cylinder, such that the slave piston is adjusted in the same direction as the master piston as a result of the pressures on opposite sides of the slave piston becoming unequal due to the discharge of slave piston motive fluid to exhaust via the selected one of said passageways.

2. A fluid-operated servomechanism as claimed in claim 1 in which the shaft of the master piston located in said bore includes an outer tube connected to and concentrically surrounding an inner shaft, said outer tube and inner shaft defining therebetween an annular discharge passage which leads to the exhaust chamber said outer tube fitting closely in said bore and having two axially separated ports extending through the wall thereof, each of said passageways being selectively connectible to the exhaust chamber via a respective one of said ports.

3. A fluid-operated servomechanism as claimed in claim 2 in which said bore has a closed end wall, a chamber being formed in said bore between said end wall and where said inner shaft and outer tube terminate in the bore, said inner shaft comprising a tube through which said chamber communicates with atmosphere.

4. In a gas turbine engine including a compressor, a pressure fuel source, and a plurality of adjustable control members for controlling operation of the engine, a fluid-operated servomechanism as claimed in claim 1, said pressure fuel source being said slave piston motive fluid source, said compressor having two different stage tappings serving as said first and second control pressure fluid sources respectively, and said control members having a common rotatable operating shaft, which shaft is connected to the shaft of the slave piston of the servomechanism for rotation thereby.

References Cited in the file of this patent
UNITED STATES PATENTS

| | | |
|---|---|---|
| 2,613,029 | Wilde | Oct. 7, 1952 |
| 2,705,940 | Edwards | Feb. 14, 1955 |
| 2,746,242 | Reed | May 22, 1956 |
| 2,941,354 | Sobey | June 21, 1960 |
| 2,971,583 | Hansen | Feb. 14, 1961 |
| 3,007,446 | Reitman | Nov. 7, 1961 |
| 3,085,397 | Jubb | Apr. 16, 1963 |

FOREIGN PATENTS

| | | |
|---|---|---|
| 736,003 | Great Britain | Aug. 31, 1955 |

OTHER REFERENCES

"The Control of Turbojet Engines," by Winters, Aeronautical Engineering Review, June 1955.